UNITED STATES PATENT OFFICE 3,741,935
Patented June 26, 1973

3,741,935
HIGH SOLIDS THERMOSETTING BETA-KETO ESTER COATING COMPOSITIONS
Rostyslaw Dowbenko, Gibsonia, Pa., assignor to PPG Industries, Inc., Pittsburgh, Pa.
No Drawing. Filed Mar. 4, 1971, Ser. No. 121,174
Int. Cl. C08g 15/00
U.S. Cl. 260—65
6 Claims

ABSTRACT OF THE DISCLOSURE

High solids, thermosetting coating compositions are produced from a reaction product having a plurality of beta-keto ester groups and condensation products of formaldehyde with melamine, urea or benzoguanamine. Reactive copolymers may also be admixed with the above compositions for co-curing.

BACKGROUND OF THE INVENTION

Federal, state and local governments and the populace in general have become alarmed about pollution of water and air. Air pollution is of particular pertinence to the coatings industry because of solvent emissions into the air when utilizing many of the conventional application techniques known in the industry to apply coating compositions. Thus, recently, much anti-pollution legislation has been passed to control the emission of hydrocarbon solvents that are photochemically reactive. As results of the concern and control, the coatings industry has made considerable effort to reduce or eliminate objectionable solvent emissions from coating operations. Such efforts include the formulation of water-based coatings, nonaqueous coatings, and solvent-free or high solids coatings.

- Thus, coating research has investigated a wide variety of copolymers, interpolymers, homopolymers, esters, acids, solvents, monomers and the like, to reduce, minimize, or eliminate such solvent emissions.

Although beta-keto esters have been known in the art for some time, they have not been employed to any substantial degree to formulate coating compositions. One of the major uses in coatings has been that of a plasticizer. Esters such as ethyl acetoacetate have been an important starting material in the manufacture of azo dyes, such as Hansa yellow G, Hansa yellow R, Fast Light Yellow and Ericochrome Red B, and have been used in the manufacture of the pyrazolone drugs such as antipyrine and aminopyrine.

Generally, because these esters are fluid, soft and flexible, it has not been considered feasible to crosslink these esters with other components to form a continuous protective or decorative film.

DESCRIPTION OF THE INVENTION

Now it has been found that high solids coating compositions can be produced from a reaction product of a beta-keto ester having one or more beta-keto ester groups and a polyol when blended with an appropriate amount of a crosslinking agent.

The solids content of the particular composition is somewhat flexible and depends on the desired results; however, compositions having a solids content of from about 80 to 100 percent can readily be formulated and applied by any of the known conventional means such as brushing, air spraying, electrostatic spraying, reverse roll coating, dipping, flow coating, curtain coating, and the like.

When formulated at such a high solids content, there remains very little solvent which can escape into the air, thus this invention provides a significant advance in controlling air pollution due to solvent emissions from coating compositions.

The reaction product produced, mentioned hereinabove, is made from a beta-keto ester having one or more beta-keto groups and a polyol. The beta-keto esters utilized have the general formula:

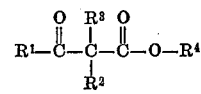

wherein $R^1$ represents a hydrocarbon radical having 1 to 10 carbon atoms, such as alkyl, aryl, carbalkoxy, acyl, benzyl, phenyl, and the like; $R^2$ and $R^3$ represent hydrogen or a hydrocarbon radical having 1 to 6 carbon atoms; and $R^4$ represents a hydrocarbon radical having 1 to 6 carbon atoms.

Such beta-keto esters may readily be prepared by means for Claisen condensation; for example, ethyl acetoacetate is readily treated with sodium ethoxide and the resulting mixture is acidified; there is generally obtained ethyl beta-ketobutyrate (ethyl 3 - oxybutanoate) generally known as ethyl acetoacetate or acetoacetic ester. Examples of other beta-keto esters that may be utilized in this invention include alkyl acetoacetates, such as ethyl, methyl, n-propyl, isopropyl, n-butyl, isobutyl, sec-butyl, tert-butyl, and isoamyl acetoacetates, and the like.

Benzoylacetates, such as ethyl, methyl, n-propyl, isopropyl, n-butyl, isobutyl and sec-butyl benzoylacetate, and the like, may also be employed.

Various homologs of ethyl acetoacetate may also be utilized, for example, ethyl alpha-alkyl- and alpha,alpha-dialkyl-acetoacetates ($CH_3COCHR^2COOC_3H_5$ and $$CH_3COCR^2R^3COOC_3H_5$$

wherein the $R^2$ and $R^3$ each are methyl, ethyl, n-propyl, n-butyl or the like, and can be the same or different The preferred beta-keto esters are the lower alkyl-substituted acetoacetates such as ethyl acetoacetate and methyl acetoacetate.

The polyols employed may be represented by the general formula $R^5(OH)_n$, wherein $R^5$ represents a hydrocarbon radical having 2 to about 20 carbon atoms, and $n$ is an integer from 2 to 6. Examples of such polyols include ethylene glycol, diethyleneglycol, 1,4-butanediol, triethylene glycol, propylene glycol, glycerol, trimethylolpropane, pentaerythritol and the like; pentitols such as ribitol, xylitol and di- and 1-arabitol; and hexitols such as dulcitol, sorbitol, d-mannitol, 1-iditol, d-talitol, allitol and the like.

Generally, any polyfunctional aliphatic, alicyclic, aromatic or heterocyclic polyol may be employed.

Some of the more complex, commercially-available polyols that may be used include bis(4-hydroxyphenyl)2,2-propane,
4,4-dihydroxy-benzophenone,
bis(4-hydroxyphenyl)1,1-ethane,
bis(4-hydroxyphenyl)1,1-isobutane,
bis(4-hydroxyphenyl)2,2-butane,
bis(4-hydroxytertiarybutylphenyl)2,2-propane,
bis(4-hydroxynaphthylene)methane,
1,5-dihydroxynaphthylene, and the like.

The preferred polyols for purposes of this invention include trimethylolpropane and pentaerythritol.

The reaction between the beta-keto ester and the polyol is a simple transesterification reaction which may be catalyzed by heat, acid or base. Heating is the preferred means of catalyzing the reaction for purposes of the invention. The reaction product obtained, having a plurality of beta-keto groups, is represented by the general formula:

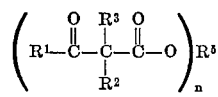

wherein $R^1$, $R^2$, $R^3$, $R^5$ and $n$ have the meaning hereinabove disclosed. The preferred reaction products for purposes of this invention include those produced from ethyl acetoacetate and the polyols trimethylolpropane and pentaerythritol such as trimethylolpropane tris(acetoacetate) and pentaerythritol tetra(acetoacetate).

The particular reaction product produced from the beta-keto ester and the polyol is blended or mixed with a cross-linking agent to provide the coating compositions of the invention. The proportion of crosslinking agent is usually from about 5 to about 50 percent based on the total weight of the reaction product and the crosslinking agent, although as high as 80 percent and as low as 1 percent crosslinking agent may be employed with desirable results.

Any crosslinking agent which is reactive with the beta-keto ester groups of the reaction product may be used Generally, amino resins, such as amine-aldehyde condensation products, perform well. Examples of such amine-aldehyde condensation products are aldehyde condensation products of melamine, urea, benzoguanamine, acetoguanamine or a similar compound.

Generally, the aldehyde employed is formaldehyde, although useful products can be made from other aldehydes such as acetaldehyde, crotonaldehyde, acrolein, benzaldehyde, furfural and others. Condensation products of melamine, urea, and benzoguanamine are preferred. Particularly suitable are alkylated hexamethylol melamines such as hexakis(methoxymethyl)melamine, hexylated methylated methylol melamine and the like, but products of other amines and amides in which at least one amido group is present can be employed. For example, such condensation products can be produced from triazines, diazines, triazoles, guanadines, guanamines, and alkyl- and aryl-substituted derivatives of such compounds, including alkyl-substituted and aryl-substituted cyclic ureas, and alkyl- and aryl-substituted melamines. Examples of such compounds are N,N'-dimethylurea, formaguanamine, benzoguanamine, ammeline, 2-chloro-4,6-diaminopyrimidine; 2,4,6-triphenyltriamino-1,3,5-triazine, and the like.

These aldehyde condensation products contain methylol groups or similar alkylol groups, depending on the particular aldehyde employed, and in many cases these methylol groups are etherified by reaction with an alcohol. Various alcohols are employed for this purpose, including essentially any monohydric alcohol, although the preferred alcohols are methanol, butanol, and similar lower alkanols.

In addition to the above-described crosslinking agents, many other compounds may be employed as crosslinking agents or, in many instances, if desirable, may be admixed and co-cured with the reaction product and any other crosslinking agents.

Examples of such components include resins such as oil-modified and non-oil modified alkyds; epoxidizing oils, that is, epoxidized fatty acid esters, preferably containing at least 8 carbon atoms; nitrocellulose resins; hydrocarbon resins, such as polyethylene and polypropylene; phenolic resins such as those produced from ester diols, isocyanates, and polycaprolactones; vinyl resins, such as polymers and copolymers of vinyl chloride, vinyl acetate, vinylidene chloride, and the like; and acrylic resins, such as interpolymers of an ethylenically unsaturated carboxylic acid amide or hydroxyl-containing acrylate or methacrylate ester.

Likewise, minor amounts of a diisocyanate may readily be incorporated and crosslinked to produce desired characteristics. A wide variety of organic diisocyanates may be employed, including aromatic, aliphatic, and cyclo-aliphatic diisocyanates. Representative compounds include 2,4-tolylene diisocyanate, m-phenylene diisocyanate, 4,4'-biphenylene diisocyanate, 1,5-nephthylene diisocyanate, 1,4-tetramethylene diisocyanate, 1,4-cyclohexylene diisocyanate, and the like. Arylene diisocyanates, i.e., those in which each of the two isocyanate groups is attached to an aromatic ring, are preferred. These diisocyanates may contain other substituents, although those that are free from reactive groups other than the two isocyanate groups are ordinarily preferred. In some instances, dimers of the monomeric diisocyanates and di(isocyanatoaryl) ureas such as di(3-isocyanato-4-methylphenyl)urea, may also be used.

The crosslinking agent is usually blended with from about 20 to about 95 percent of the reaction product hereinabove described, based on total weight of the reaction product and the crosslinking agent; however, this ratio may be varied somewhat depending on the particular desired results. In addition, a small amount of catalyst is usually added to accelerate the crosslinking mechanism. Such catalyst may include a free radical catalyst such as lauroyl peroxide, t-butyl hydroperoxide, benzoyl peroxide, hydrogen peroxide, cumene hydroperoxide, ammonium or potassium persulfate, and the like; an acid catalyst such as maleic anhydride, oxalic acid, hydrochloric acid, p-toluenesulfonic acid, sulfuric acid, or alkyl phosphoric acids such as butyl phosphoric acid and the like.

The exact mechanism of the crosslinking reaction is not known, however, it is believed to be similar to the condensation reaction of acetoacetates with formaldehyde.

The resinous compositions of this invention are readily adaptable to pigmentation by utilization of pigments known in the art. For example, titanium dioxide, encapsulated aluminum, silica, lead silico chromate, carbon black, talc, barium sulfate, and the like, as well as combinations of these and similar pigments, may be used. Color pigments such as cadmium red, cadmium yellow, phthalocyanine blue, phthalocyanine green, chrome green, toluidine red, hydrated iron oxide, and the like may be included, if desired. Also, generally incorporated into the pigment composition is a dispersing agent, a surface-active agent or adhesion enhancing agents. The surface-active agent can be non-ionic, anionic or cationic, or a combination thereof. Dispersing agents such as ethoxylated alkyl phenyl phosphate can be employed. Adhesion enhancing agents such as cellulose acetate butyrate may be added in sufficient amounts to provide the required adhesion.

Other components which may be included in these coating compositions if desired, include, for example, melting agents, flow agents, fungicides, anti-oxidants, and the like.

Set forth below are several specific embodiments of the preparation of the coating compositions of this invention. These embodiments are illustrative and are not to be construed as limiting the invention. All parts and percentages are based upon non-volatile solids content and are by weight unless otherwise indicated.

Example I

A reaction product was produced from the following:

| | Parts by weight |
|---|---|
| Ethyl acetoacetate | 1757.7 |
| Trimethylolpropane | 402.0 |

The mixture was heated to 45° C. The trimethylolpropane became dissolved in the ethyl acetoacetate. On continued heating to 110° C. ethanol began to distill off. The solution was a clear yellow color. After continuing the reaction for 12 hours, a total of 501 parts of distillate were collected. Upon subjecting the residue to vacuum (1.5 mm.) distillation, in the presence of a nitrogen atmosphere, an additional 69 parts of distillate were removed.

A coating composition, about 100 percent solids content, was produced by mixing 70 parts of the resinous reaction product with 30 parts of hexakis(methoxymethyl)-melamine (Cymel 300) and then was drawn down on a steel panel in such a manner as to produce a dry film of 1 to 20 mils thickness. The coating was then baked for 30 minutes at 350° F.

The cured film was yellow in color and was hard, not brittle, and only slightly soluble when rubbed with acetone.

Example II

The reaction product utilized in this example was produced in a manner similar to the reaction product employed in Example I except that 268.0 parts of trimethylolpropane and 1562.4 parts of ethyl acetoacetate were utilized and reaction was carried out at 130° C. for 2 hours and 15 minutes.

A total of 20 parts of hexakis(methoxymethyl)melamine and 80 parts of the above reaction product were blended and drawn down on a steel panel and baked for 30 minutes at 350° F. This system did not cure as well as Example I and remained somewhat soft and fluid. However, upon the addition of one percent (based on total resin solids) of para-toluenesulfonic acid, a noticeable improvement in the cure was observed.

Example III

A reaction product employing pentaerythritol was prepared as follows:

| | Parts by weight |
|---|---|
| Pentaerythritol | 408.0 |
| Ethyl acetoacetate | 3124.0 |

The above reactor charge was heated to 128° C. and after about 30 minutes the mixture was a homogeneous yellow solution as ethanol began distilling off. The temperature was permitted to rise to 170° C. and over a 4 hour and 15 minute reaction time 556.9 parts of distillate (ethanol) were collected.

Subsequently, the residue was subjected to vacuum distillation in the presence of a nitrogen atmosphere, and heated to about 100° C. for 1½ hours at a pressure of about 0.3 mm. and as the distillation continued, the temperature was permitted to rise to 176° C. and maintained for an additional hour. An additional 1632.3 parts of distillate were removed in this manner.

Upon blending 50 parts of the reaction product (above) and 50 parts of hexakis(methoxymethyl)melamine (Cymel 301), a homogeneous composition (about 100 percent solids content) was obtained, which when drawn down on a steel panel and baked for 30 minutes at 350° F. produced a clear yellow solvent-resistant film.

Example IV

Example IV had the same composition as Example III, except that Example IV had added to it one drop of a catalyst (a 3 percent solution of mono- and dibutylphosphate). When this composition was drawn down on a steel panel and baked 30 minutes at 350° F., a significant improvement was noted in curing as the films produced were harder and tougher.

Example V

A coating composition, about 100 percent solids content, was produced by blending 60 parts of the reaction product used in Example II, 40 parts of hexakis(methoxymethyl)melamine and 0.1 percent silica (Cab-O-Sil M-5). When drawn down on a steel panel and baked 30 minutes at 350° F., there was obtained a continuous film, which was flexible and adherent.

Example VI

The following components were blended to produce a coating composition about 88 percent solids content: 40 parts of the reaction product employed in Example I, 30 parts of hexakis(methoxymethyl)melamine; and 30 parts alkyd (40.8 percent coconut fatty acid, 42.3 percent phthalic anhydride and 16.9 percent glycerine). When the composition was drawn down on a steel panel and baked, clear flexible films which had good gloss and solvent-resistance were obtained.

Example VII

A coating composition was produced by blending 60 parts of the reaction product employed in Example I, 15 parts hexakis(methoxymethyl)melamine; and 25 parts alkyd resin (comprising nadic methyl anhydride, propylene glycol and castor oil). On baking, films produced from this composition were hard and adherent but were slightly brittle.

Example VIII

A coating composition was produced by blending 50 parts of the reaction product of Example I; 20 parts of hexakis(methoxymethyl)melamine; and 30 parts alkyd resin (comprising nadic methyl anhydride, propylene glycol and castor oil). This composition was drawn with a .44 mil drawbar on steel panels, which upon baking 30 minutes at 350° F. provided a dry film thickness of 0.1 mil. Upon subjecting the above films to conventional salt spray tests for 180 hours, the results indicated that such films provide adequate protection for many purposes.

Below are listed several coating compositions which were formulated in such a manner as to provide systems that were suitable to spraying at a high solids content, from about 80 percent to about 90 percent, by employing conventional spray equipment.

Example IX

| | Parts by weight |
|---|---|
| Reaction product (Example I) | 31 |
| Hexahydrophthalic ethylene | 30 |
| Alkyd (comprising 38.66% neopentyl glycol sebacate, 16.8% neopentyl glycol hexahydrophthalate, 32.7% trimethylol propane-hexahydrophthalate, 10.24% trimethylolpropane and 1.6% 2-hydroxyethyl ethyleneimine) | 9 |
| Hexakis(methoxymethyl)melamine | 30 |

Example IX had a good pattern and provided for uniform coverage on various shaped articles.

Example X

| | Parts by weight |
|---|---|
| Reaction product (Example I) | 31 |
| Polyol (40.6% ester diol, 16.6% aliphatic isocyanate and 42.8% polycaprolactone) | 30 |
| Paste A (below) | 73 |
| Hexakis(methoxymethyl)melamine | 30 |
| Cumene hydroperoxide | 1 |

Example XI

| | Parts by weight |
|---|---|
| Reaction product (Example I) | 35.0 |
| Paste (10% red iron oxide and 90% hexahydrophthalic ethylene glycol diacrylate) | 30.0 |
| Polyol (hexahydrophthalic ethylene glycol diacrylate) | 8.0 |
| Polyester (unsaturated polyester of adipic acid, ester diol 204 and glycidyl methacrylate) | 50.0 |
| Cellulose acetate butyrate (Eastman Kodak 551.02) | 1.5 |
| Condensation product of an aldehyde and a melamine (Rohm and Haas QR-483) | 37.6 |
| Cumene hydroperoxide | 1.5 |

Example X was a white pigmented coating composition which was suitable for spray application. The composition was sprayed at 88.5 percent solids content and produced relatively smooth appearing films. These films were baked in the manner hereinabove disclosed.

Example XI was also a high solids coating composition which produced red semi-gloss films when sprayed and baked.

The coating compositions of Example X and XI with slight formulation modifications may also be employed in reverse roll coating, dipping or flow-coating operations to provide suitable films.

Other reaction products as described herein may be employed in the same manner as the above examples. For instance, there can be used the products produced by reacting trimethylolpropane or pentaerythritol with acetoacetate, n-propyl acetoacetate, isopropyl acetoacetate or n-butyl acetoacetate. Various other polyols can also be used in similar manner, such as diethylene glycol, propylene glycol, and 1,4-butanediol.

Other amine-aldehyde condensation products such as those produced from benzoguanamine, N,N'-dimethyl urea, ethoxymethoxymethyl melamine may be employed to replace the hexakis(methoxymethyl)melamine utilized in the above examples.

Other co-curing components or crosslinking agents that may be admixed include epoxidized oils, hydrocarbon resins, hydroxyl functional acrylic resins and the like.

Also, in some instances, a particular property may be obtained by admixing with a diisocyanate such as 2,4'-tolylene diisocyanate or similar diisocyanate.

Likewise, pigment substitutions may be made. For example, carbon black may be employed to provide desired color and protective properties. Gloss and texture of the particular composition may be controlled by varying the amount of a particular flattening pigment.

According to the provisions of the Patent Statutes, there are described above the invention and what are considered to be its best embodiments. However, within the scope of the appended claims, it is to be understood that the invention can be practiced otherwise than as specifically described.

I claim:

1. A heat-hardening, non-gelled, high solids polymeric resinous coating composition comprising:
   (a) from about 20 to about 95 percent based on weight of total reaction product and cross-linking agent of a reaction product having a plurality of beta-keto ester groups wherein said reaction product is comprised of a beta-keto ester having the general formula:

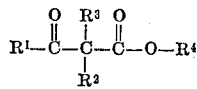

wherein $R^1$ represents a hydrocarbon radical having 1 to 10 carbon atoms; $R^2$ and $R^3$ are each hydrogen or a hydrocarbon radical having 1 to 6 carbon atoms; and $R^4$ represents a hydrocarbon radical having 1 to 6 carbon atoms, and a polyol having the general formula:

$$R^5(OH)_n$$

wherein $R^5$ represents a hydrocarbon radical having 2 to about 20 carbon atoms, and $n$ is an integer from 2 to 6; and (b) from about 5 to about 80 percent based on weight of total reaction product and crosslinking agent of a crosslinking agent containing alkylol groups or alkylol groups which have been etherified by reaction with an alcohol selected from a member of the class consisting of condensation products of an aldehyde with melamine, urea or benzoguanamine.

2. The composition of claim 1 wherein said beta-keto ester is represented by the general formula:

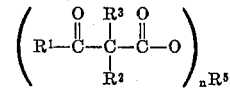

where $R^1$ is a hydrocarbon radical having up to about ten carbon atoms; $R^2$ and $R^3$ are each hydrogen or a hydrocarbon radical having up to about 6 carbon atoms; $R^5$ represents a hydrocarbon radical having 2 to about 20 carbon atoms; and wherein $n$ is an integer from 2 to 6.

3. The composition of claim 1 wherein said reaction product is trimethylolpropane tris(acetoacetate).

4. The composition of claim 1 wherein said reaction product is pentaerythritol tetra(acetoacetate).

5. The composition of claim 1 wherein said crosslinking agent is selected from a member of the class consisting of condensation products of formaldehyde with melamine, urea or benzoguanamine.

6. The composition of claim 5 wherein said condensation product is alkylated hexamethylol melamine.

References Cited
UNITED STATES PATENTS

| | | | |
|---|---|---|---|
| 3,017,388 | 1/1962 | Caldwell et al. | 260—65 |
| 2,488,883 | 11/1949 | Shokal et al. | 260—64 |
| 3,039,996 | 6/1962 | Ferstandig et al. | 260—63 |
| 3,607,834 | 9/1971 | Marx et al. | 260—63 R |

WILLIAM H. SHORT, Primary Examiner

L. L. LEE, Assistant Examiner

U.S. Cl. X.R.

117—132 B, 161 LN, 161 UN; 260—15, 16, 17.3 R, 18 EP, 21, 30.6 R, 39 P, 39 M, 39 SB, 40 R, 47 CB, 47 CZ, 63 N, 64